Patented Dec. 14, 1943

2,336,667

UNITED STATES PATENT OFFICE 2,336,667

STABILIZED ETHER

Edgar C. Britton and Gerald H. Coleman, Midland, Mich., assignors to The Dow Chemical Company, Midland, Mich., a corporation of Michigan No Drawing. Application August 1, 1940,
Serial No. 349,224

13 Claims. (Cl. 260—611.5)

This invention is concerned with the treatment of aromatic-aliphatic ether halides and is particularly directed to the stabilization of ethers having the formula $$R—(O—A)_n—Cl$$

wherein R represents an aromatic radical of the benzene series, A represents an alkylene radical containing from 2 to 5 carbon atoms, inclusive, and n is an integer not greater than 3, and the improved compositions thereby obtained.

When the aromatic-aliphatic ether chlorides are exposed to the action of air and light, they eventually undergo a partial decomposition with the formation of aldehydic and acidic products. These contaminants impart a disagreeable odor to the ether products and render them somewhat corrosive to metals, whereby their utility as modifiers for plastic compositions and as insecticidal toxicants is greatly reduced.

The problem is of particular importance with respect to halo-phenoxy-alkoxy-alkyl-chlorides and especially in the preparation and use of beta - (2.4.6 - trichlorophenoxy)-beta'-chloro-di - ethyl ether. When freshly distilled, the latter compound is substantially odorless and, if stored in amber glass containers, does not develop odor or acidity for long periods. In clear glass or when directly exposed to air and light, an aldehydic odor develops along with appreciable acidity. This undesirable characteristic is particularly noticeable when the compound is purified by fractional distillation in iron equipment as is the general practice in large scale operation.

It is among the objects of the present invention to provide a process for inhibiting the decomposition of the aromatic-aliphatic ether chlorides. A further object is to stabilize such compounds against the development of objectionable odor and corrosion properties. Another object is to provide stabilized ether compositions as hereinafter described.

According to the present invention, the aromatic-aliphatic ether chlorides are stabilized against decomposition and development of undesirable odor and acidity by incorporating therewith one or more phenols or the amine salts of phenols. The proportion in which such addition agent is employed is dependent upon the length of time for which it is desired to stabilize the ether compound and the particular agent or combination of agents selected. While any desired proportion of stabilizing agent may be employed, the use of from 0.02 to 2.0 per cent by weight thereof in the stabilized composition is generally adequate. From about 0.05 to 0.5 per cent is sufficient in most instances. In the recommended amounts, the presence of such addition agents in the ether compound does not interfere with the use of the latter in plastic compositions. The presence of the stabilizer frequently increases the effectiveness of the ether compound for insecticidal use.

The general method employed in determining the effect of various compounds as stabilizers consisted of introducing 15 to 20 grams of the ether compound containing the stabilizer into a 2-ounce colorless glass bottle having a screw cap closure lined with tin foil. The bottle and contents were then exposed to the rays from a mercury vapor lamp at a distance of about three inches. The samples were inspected from time to time during the period of the test to determine whether or not odor had developed in the ether compound and the general condition of the foil lining of the closure as regards corrosion. Controls were run in which various samples of the ether compound were employed without the use of a stabilizer. As the stability of the control materials employed varied considerably depending upon the exact method of purification and general handling prior to the determination, the results set forth in the following examples are grouped so as to be readily compared with the control results peculiar to the determinations concerned.

Example 1

Beta-(2.4.6-trichloro-phenoxy) - beta' - chlorodiethyl ether samples were modified with small amounts of phenols and amine salts of phenols and exposed to the action of the light rays from a mercury vapor lamp as previously described. The controls employed with each group of determinations developed objectionable odor and corrosive properties within a short time, the exact period of exposure varying with the individual samples. The following table sets forth the results obtained with representative stabilized compositions:

| Stabilizing agent | Concentration in percent by weight | Hours exposure to produce | |
|---|---|---|---|
| | | Odor | Corrosion |
| 4-N-benzyl-amino-phenol | 0.1 | More than 53 | More than 53 |
| 4,4'-dihydroxy-diphenyl | 0.1 | 13 | More than 53 |
| 4-tertiarybutyl catechol | 0.1 | More than 53 | 37 |
| Control | | 3 | 3 |
| 4,4'-dihydroxy-diphenyl | 0.1 | 253 | 181 |
| Di-(dicyclohexyl-amine) salt of 4-tertiarybutyl catechol | 0.1 | 205 | 133 |
| Dicyclohexyl-amine salt of 4-tertiarybutyl phenol | 0.1 | | 133 |
| Ethylene-diamine salt of 4-tertiarybutyl catechol | 0.1 | 85 | 85 |
| 4-tertiarybutyl catechol | 0.05 | 43 | 42 |
| 3,3'-diallyl-4,4'-dihydroxy-diphenyl | 0.1 | 85 | 13 |
| Control | | 25 | 3 |
| 4,4'-dihydroxy-diphenyl | 0.05 | 388 | 246 |
| Ethylene-diamine salt of 4-tertiarybutyl phenol | 0.05 | 388 | 172 |
| Dicyclohexyl-amine salt of 4-tertiarybutyl phenol | 0.05 | 246 | 100 |
| Ethylene-diamine salt of 4-tertiarybutyl catechol | 0.05 | 172 | 100 |
| Dicyclohexyl-amine salt of 4-tertiarybutyl catechol | 0.05 | 148 | 52 |
| 4-tertiarybutyl catechol | 0.05 | 100 | 52 |
| 4-tertiarybutyl phenol | 0.1 | 388 | 28 |
| Dicyclohexyl-amine salt of pentachloro phenol | 0.05 | More than 136 | 28 |
| Dicyclohexyl-amine salt of 2-chloro-6-phenylphenol | 0.05 | 100 | 28 |
| Control | | 28 | 8 |
| Dicyclohexyl-amine salt of 4,4'-dihydroxy-diphenyl | 0.1 | 832 | 832 |
| 2,2'-dihydroxy-benzophenone | 0.1 | More than 652 | 606 |
| Thymol | 0.1 | More than 652 | 606 |
| 3,3'-dibenzyl-4,4'-dihydroxy-diphenyl | 0.1 | More than 560 | 536 |
| 3,3'-dipropyl-4,4'-dihydroxy-diphenyl | 0.1 | More than 560 | 338 |
| 2,4-ditertiarybutyl phenol | 0.1 | More than 314 | 279 |
| 4,4'-dihydroxy-diphenyl | 0.05 | More than 314 | 279 |
| Monoethyl-2-hydroxy-diphenyl | 0.1 | More than 314 | 219 |
| 2-hydroxy-5-tertiarybutyl diphenyl | 0.1 | More than 314 | 170 |
| Control | | 110 | 8 |
| Carvacrol | 0.1 | More than 338 | 181 |
| Control | | 82 | 23 |

Example 2

In order to determine the probable effect of storing stabilized aromatic-aliphatic ether chlorides in metal drums and containers, a series of accelerated tests was carried out in the presence of black iron, tinned iron, and galvanized iron. The general procedure followed was that employed in Example 1, except that strips 0.05 x 1 x 5 centimeters in size of the various metals were partially immersed in the stabilized ether compositions during exposure to the light rays. A sample of beta-(2.4.6-trichloro)-beta'-chlorodiethyl ether was employed as the test ether compound. A control sample of this material developed odor in 21 hours and corroded the foil lining of the bottle cap in 174 hours.

When one of the black iron strips was immersed in the ether compound, odor developed and corrosion occurred within 21 hours. The addition of 0.1 per cent by weight of thymol inhibited odor and acid development for 174 hours. An ether sample containing an iron strip and 0.1 per cent by weight of 2.2'-dihydroxy-benzophenone showed no corrosion for 174 hours and had not developed odor after 504 hours' exposure. A condensation product of 4-tertiarybutyl phenol with N-N'-N''-tri-(2-methyl-cyclohexyl)-beta-beta'-diamino-diethyl amine gave a comparable control of acid development at a concentation of 0.1 per cent by weight and controlled odor development for 333 hours.

Similar results were obtained when tinned iron and galvanized iron strips were substituted for the black iron used in the above determinations.

Example 3

In a like manner other aromatic-aliphatic ether chlorides were modified with phenols and amine salts thereof in amounts sufficient to inhibit decomposition. The following table summarized the results obtained with representative compositions employed:

| Ether compound | Stabilizing agent | Concentration in per cent by weight | Hours exposure to produce | |
|---|---|---|---|---|
| | | | Odor | Corrosion |
| Beta-(5-alpha-phenylethyl-2-xenoxy)-beta'-chloro-diethyl ether | Thymol | 0.1 | 87 More than 735 | |
| Do | | | | 283 |
| Beta-(4-tertiarybutyl-phenoxy)-beta'-(2-chloro-ethoxy)-diethyl ether | | | | More than 312 |
| Beta-(4-tertiarybutyl-phenoxy)-beta'-(2-chloro-ethoxy)-diethyl ether | 2,2'-dihydroxy-benzo-phenone | 0.1 | | |
| Beta-phenoxy-beta'-(2-chloro-ethoxy)-diethyl ether | Thymol | 0.1 | 180 More than 180 | 108 More than 216 |
| Do | | | | |

Example 4

2.0 pounds of 4-tertiarybutyl-catechol was dissolved in 2000 pounds of beta-(2.4.6-trichlorophenoxy)-beta'-chlorodiethyl ether which had been purified by fractional distillation under reduced pressure from iron equipment. This modified product was placed in 55-gallon black iron drums and stored at naturally-occurring temperatures and samples withdrawn from time to time to determine whether or not objectionable odor and acidity were developing. At the end of five months, the ether compound had shown no decomposition and the drum lining exhibited no sign of corrosion. In a control determination, a drum filled with the ether compound alone decomposed within one week to give an inferior product characterized by strong odor and high acidity.

Other aromatic-aliphatic ether chlorides which may be stabilized in the manner set forth in the examples included the chloro-ethyl, chloropropyl, chloro-butyl, and chloro-amyl ethers of phenols and the corresponding chloro-alkoxy-alkyl and chloro-poly-alkoxy-alkyl derivatives. Representative compounds are beta-(4-teritiary-butyl-phenoxy)-ethyl chloride, beta-(2.4.6-trichloro-phenoxy)-propyl chloride, gamma-(2-cyclohexyl-phenoxy)-propyl chloride, beta-(2-xenoxy)-n-butyl chloride, beta-(2-bromo-4-methyl - phenoxy) - n - amyl chloride, beta - (2-methyl-5-isopropyl-phenoxy)-beta'-chloro-dipropyl ether, gamma-(3-propoxy-phenoxy)-gamma'-chloro-dipropyl ether, delta-toloxy-delta'-chloro-di-n-butyl ether, omega-(4-tertiarybutyl-phenoxy) - omega' - chloro - diamyl ether, etc.

Instead of the addition agents shown in the examples, other hydroxy-aromatic compounds and their amine salts may be employed. Among the derivatives which may be substituted for the stabilizers heretofore set forth are phenol, catechol, pyrogallol, guaiacol, xylenol, 4-benzyl-phenol, 4-amino-phenol, 2-cyclohexyl-phenol, alpha-naphthol, di-(n-butyl)-amine salt of guaiacol, the glycine ethyl ester salt of 4-chloro-phenol, the di-(diethanol-amine) salt of catechol, the cyclohexyl-amine salt of phenol, the benzylamine salt of alpha-naphthol, the diphenylamine salt of 4-benzylamino-phenol or mixtures of two or more of any of these compounds.

We claim:

1. The process which comprises dissolving between 0.02 and 2.0 per cent by weight of a member of the class consisting of phenols and their amine salts in an aromatic-aliphatic ether chloride having the formula R—(O—A)$_n$—Cl wherein R represents an aromatic radical of the benzene series, A represents an alkylene radical containing from 2 to 5 carbon atoms, inclusive, and $n$ is an integer not greater than 3, to stabilize the ether and to inhibit the development of corrosive and odoriferous decomposition products therein.

2. A composition of matter comprising an ether having the formula

R—(O—A)$_n$—Cl wherein R represents an aromatic radical of the benzene series, A represents an alkylene radical containing from 2 to 5 carbon atoms, inclusive, and $n$ is an integer not greater than 3, and sufficient of a compound selected from the group consisting of phenols and their amine salts to inhibit the development of corrosive and odoriferous decomposition products therein.

3. A composition of matter comprising an ether having the formula

R—(O—A)$_n$—Cl wherein R represents an aromatic radical of the benzene series, A represents an alkylene radical containing from 2 to 5 carbon atoms, inclusive, and $n$ is an integer not greater than 3, and sufficient of a phenol to inhibit the development of corrosive and odoriferous decomposition products therein.

4. A composition of matter comprising an ether having the formula

R—(O—A)$_n$—Cl wherein R represents an aromatic radical of the benzene series, A represents an alkylene radical containing from 2 to 5 carbon atoms, inclusive, $n$ is an integer not greater than 3, and sufficient of an amine salt of a phenol to inhibit the development of corrosive and odoriferous decomposition products therein.

5. A composition of matter comprising an ether having the formula

X—(O—A)$_n$—Cl wherein X represents a halo-aromatic radical of the benzene series, A represents an alkylene radical containing from 2 to 5 carbon atoms, inclusive, and $n$ is an integer not greater than 3, and sufficient of a compound selected from the group consisting of phenols and their amine salts to inhibit the development of corrosive and odoriferous decomposition products therein.

6. A composition of matter comprising an ether having the formula

R—(O—C$_2$H$_4$)$_n$—Cl wherein R represents an aromatic radical of the benzene series and $n$ is an integer not greater than 3, and sufficient of a compound selected from the group consisting of phenols and their amine salts to inhibit the development of corrosive and odoriferous decomposition products therein.

7. A composition of matter comprising an ether having the formula

R—O—C$_2$H$_4$—O—C$_2$H$_4$—Cl wherein R represents an aromatic radical of the benzene series, and sufficient of a compound selected from the group consisting of phenols and their amine salts to inhibit the development of corrosive and odoriferous decomposition products therein.

8. A composition of matter comprising beta-(2.4.6-trichloro-phenoxy)-beta'-chloro-diethyl ether and sufficient of a compound selected from the group consisting of phenols and their amine salts to inhibit the development of corrosive and odoriferous decomposition products therein.

9. A composition of matter comprising an ether having the formula

R—(O—A)$_n$—Cl wherein R represents an aromatic radical of the benzene series, A represents an alkylene radical containing from 2 to 5 carbon atoms, inclusive, and $n$ is an integer not greater than 3, and between 0.02 and 2.0 per cent by weight of a phenol.

10. A composition of matter comprising an ether having the formula

R—(O—A)$_n$—Cl wherein R represents an aromatic radical of the benzene series, A represents an alkylene radical containing from 2 to 5 carbon atoms, inclusive, and $n$ is an integer not greater than 3, and between 0.02 and 2.0 per cent by weight of an amine salt of a phenol.

11. A composition of matter comprising beta-(2.4.6-trichloro-phenoxy)-beta'-chloro-diethyl ether and between 0.02 and 2.0 per cent by weight of a compound selected from the group consisting of phenols and their amine salts.

12. A composition of matter comprising an ether having the formula

R—(O—A)$_n$—Cl wherein R represents an aromatic radical of the benzene series, A represents an alkylene radical containing from 2 to 5 carbon atoms, inclusive, and $n$ is an integer not greater than 3, and between 0.02 and 2.0 per cent by weight of 4-tertiarybutyl-catechol.

13. A composition of matter comprising beta-(2.4.6-trichloro-phenoxy)-beta'-chloro-diethyl ether and between 0.02 and 2.0 per cent by weight of 4-tertiarybutyl-catechol.

EDGAR C. BRITTON.
GERALD H. COLEMAN.